(12) United States Patent
Breitschwerdt et al.

(10) Patent No.: US 6,332,913 B1
(45) Date of Patent: Dec. 25, 2001

(54) MEMBRANE MODULE FOR SELECTIVE GAS SEPARATION

(75) Inventors: Sven Breitschwerdt, Waiblingen; Wolfgang Erdmann, Stuttgart; Dietmar Heil, Schwendi; Carlo Schmid, Leonberg; Steffen Wieland, Stuttgart, all of (DE)

(73) Assignee: Xcellsis GmbH, Kirchheim/Teck-Nabern (DE)

( * ) Notice: Subject to any disclaimer, the term of this patent is extended or adjusted under 35 U.S.C. 154(b) by 0 days.

(21) Appl. No.: 09/471,406

(22) Filed: Dec. 23, 1999

(30) Foreign Application Priority Data

Dec. 24, 1998 (DE) .............................. 198 60 253

(51) Int. Cl.[7] .................................................. B01D 59/12
(52) U.S. Cl. .......................... 95/55; 95/56; 96/4; 96/5; 96/7; 96/11
(58) Field of Search .................. 95/55, 56; 96/4, 96/5, 7, 11; 210/321.75, 321.84

(56) References Cited

U.S. PATENT DOCUMENTS

| | | | |
|---|---|---|---|
| 2,824,620 | * | 2/1958 | Rosset ........................................ 95/56 |
| 3,624,983 | * | 12/1971 | Ward, III ..................................... 96/5 |
| 3,797,202 | * | 3/1974 | Neulander et al. ........................... 96/5 |
| 3,925,037 | | 12/1975 | Ward, III et al. . |
| 4,187,086 | * | 2/1980 | Walmet et al. .............................. 95/44 |
| 4,430,218 | * | 2/1984 | Perl et al. ........................... 210/321.75 |
| 4,482,360 | * | 11/1984 | Taketomo et al. ........................... 95/53 |
| 4,882,050 | * | 11/1989 | Kopf .................................. 210/321.75 |
| 5,217,506 | * | 6/1993 | Edlund et al. ............................. 95/56 |
| 5,225,080 | * | 7/1993 | Karbachsch et al. ............. 210/321.75 |
| 5,486,475 | | 1/1996 | Kramer et al. . |
| 5,782,960 | * | 7/1998 | Ogawa et al. ............................ 96/11 |
| 5,868,930 | * | 2/1999 | Kopf ................................ 210/321.75 |

FOREIGN PATENT DOCUMENTS

| | | |
|---|---|---|
| 0718031 A1 | 6/1996 | (EP) . |
| 2 080 144 | 2/1982 | (GB) . |
| WO 98/30308 | 7/1998 | (WO) . |

\* cited by examiner

*Primary Examiner*—David A. Simmons
*Assistant Examiner*—Minh-Chau T. Pham
(74) *Attorney, Agent, or Firm*—Crowell & Moring LLP

(57) ABSTRACT

A membrane module for selective gas separation includes one or more separation units stacked one on the other, and at least one of interposed frame plates or stack-end frame plates. Each separation unit includes a support plate with a separation gas receiving structure and at least one corresponding gas separating membrane. The frame plates having a gas mixture flow chamber structure. Each separating unit and the frame plates contain (1) gas-mixture connecting channel structures in a first and a second side area formed by overlapping openings in the plates and extending in a stacking direction, which are in fluid connection with the gas mixture flow chamber structures; and (2) separation gas connection channel structures in a third and fourth side area, which are in fluid connection with the separation gas receiving structure or structures.

12 Claims, 2 Drawing Sheets

MEMBRANE MODULE FOR SELECTIVE GAS SEPARATION

BACKGROUND AND SUMMARY OF INVENTION

This application claims the priority of German Patent Document 198 60 253.7, filed Dec. 24, 1998, the disclosure of which is expressly incorporated by reference herein.

The invention relates to a membrane module of the stacked plate type for selective gas separation.

Such a membrane module for selective hydrogen separation is described in Offenlegungsschrift EP 0 718 031 A1. In that membrane module, the separating units form hydrogen-permeable composite membranes that consist of a support matrix covered on both sides with a selectively hydrogen-permeable metal layer with the interposition of a flexible intermediate layer. The support matrix contains a hydrogen absorbing structure able to carry away the separated hydrogen since it is formed of a porous, perforated, or slotted metal or ceramic material or a hydrogen-permeable metal material. To remove the separated hydrogen from the plate stack, laterally discharging hydrogen outlets are provided perpendicular to the stacking direction at a lateral area of the stack. Corresponding purging gas inlets leading laterally into the support matrix are provided on the opposite side of the stack. The composite membrane units alternate in the stack with frame plates which, with the interposition of gaskets, are in contact with the composite membrane units and their interior is completely open and in this manner form a gas mixture flow chamber. By means of a corresponding connecting and binding structure on the two lateral areas at which the purging gas inlets and the hydrogen outlets are located, a guided flow of gas mixture is achieved, in which the gas mixture containing the hydrogen is carried (1) from one end of the stack into the lateral area of a first frame plate, from there through its gas mixture flow chamber to the opposite lateral area, and (2) with a 180° turn to the next frame plate and through its gas mixture flow chamber. This continues until the gas mixture, free of hydrogen, is carried out from the opposite end of the stack. This serpentine course of the gas mixture, however, involves corresponding losses of pressure.

In U.S. Pat. No. 5,486,475 a membrane module of the stacked plate type is disclosed, in which a plurality of membrane pocket units are stacked one over the other. The units consist of a frame plate which is surrounded top and bottom by a gas-permeable, liquid-proof membrane, so that pockets are formed in the interior through which a mixture of fluid can flow, by which undesired gases, which are to be separated from a gas mixture, can be reacted. The frame plates are provided with inlet openings and, in an opposite lateral area, with outlet openings, in order to introduce the mixture into the pockets and take them out again. Between each two membrane pocket units, spacers are placed in opposite stack side areas, so that corresponding chambers are formed between the individual membrane pocket units, into which a supporting structure can be inserted and into which the gas mixture is introduced. The spacers are perforated such that a distribution channel is formed at the two corresponding stack side areas running parallel to the stacking direction, and a collecting channel is formed in order to carry the liquid mixture parallel into the membrane pockets and carry it away again.

Hydrogen separating membrane modules are used, for example, in fuel-cell vehicles for the purpose of selectively separating the hydrogen produced by a reforming reaction of a hydrocarbon or hydrocarbon derivative from the reformate gas mixture in order to feed it to the fuel cells. For such mobile applications in automotive technology it is desirable, for dynamic and space reasons, to make the hydrogen-separating membrane module as compact and light as possible. Therefore the membrane area per unit volume should be maximized. At the same time, the flow management must be considered. In particular, high pressure losses should be avoided because they impair the performance of the membrane module. This impairment is because the separating power depends directly on the pressure gradient between the gas mixture flowing through the membrane module and the gas separated therefrom. In addition, the membrane module must withstand high pressures in a hydrogen atmosphere at temperature up to at least 350° C., and it should be able to be manufactured at low cost.

The object of the invention is the preparation of a membrane module of the stacked plate type that can be manufactured with a given, separating power in a compact, light, and pressure-stable form with relatively little expense, and which will cause relatively little pressure loss in operation.

This object is achieved by a membrane module according to the present invention. Due to the modular construction of the stacked plate type, the membrane module can be designed very flexibly for various separating powers. The stacked plate construction also permits low-cost manufacture. Through connecting openings appropriately placed into the separating units and in the frame plates in lateral areas, connecting passage structures running in the stacking direction are formed for the input and removal of the gas mixture, as well as for the removal of the separating gas (i.e., the gas selectively removed from the gas mixture). Through these connecting passage structures, the gas mixture can be fed in parallel, with relatively little loss of pressure, through the chambers through which the gas mixture flows, and the separated gas can be withdrawn from the separating units. At the same time, the integration of the connecting passage structures in the plate stacks permits a compact design.

A membrane module embodied according to another embodiment of the present invention contains a rectangular plate stack in which the gas mixture is carried through the stack parallel to the longer side of the rectangle. The separated gas is carried away in a transverse direction through the shorter side of the rectangle. Thus, on the one hand the length of the flow of the gas mixture, which is necessary for sufficient separation, can be achieved, while the stack can be kept shorter in the transverse direction perpendicular thereto, which contributes to a compact structure and low pressure losses.

In another embodiment of the present invention, the support plate of each separating unit has on one or both sides a pattern of grooves and lands in which the grooves form passages for removing the separated gas. A gas separating membrane in each case is laid onto the groove-and-wall structure with an interposed porous supporting structure. The membrane is thus sufficiently supported, and the gas selectively separated by it can pass uniformly into the grooves and be carried away from there.

In another embodiment according to the present invention, the gas-separating membrane, together with an interposed supporting structure if any, is disposed in a recess in the adjacent frame plate. Thus, when the membrane module plate stack is assembled it can be held securely in the frame plate recess. In addition, this creates the possibility of manufacturing the support plate at relatively low expense as a flat component into which a separating gas receiving structure is created on one or both sides.

In a membrane module according to another embodiment, metal materials are selected for the different components of the plate stack such that the components can be assembled gas-tight in a single soldering or welding process. This reduces the manufacturing cost.

Other objects, advantages and novel features of the present invention will become apparent from the following detailed description of the invention when considered in conjunction with the accompanying drawings.

DETAILED DESCRIPTION OF THE DRAWINGS

Figure 1:
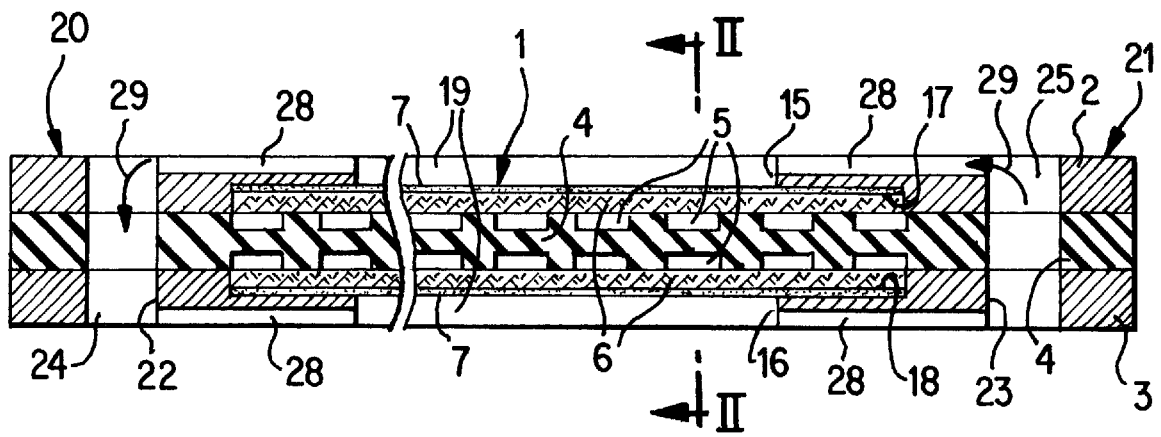
FIG. 1 is a shortened cross sectional view of a stacking unit of a membrane module for hydrogen separation, with a separating unit and bilaterally adjoining frame plates.
Figure 2:
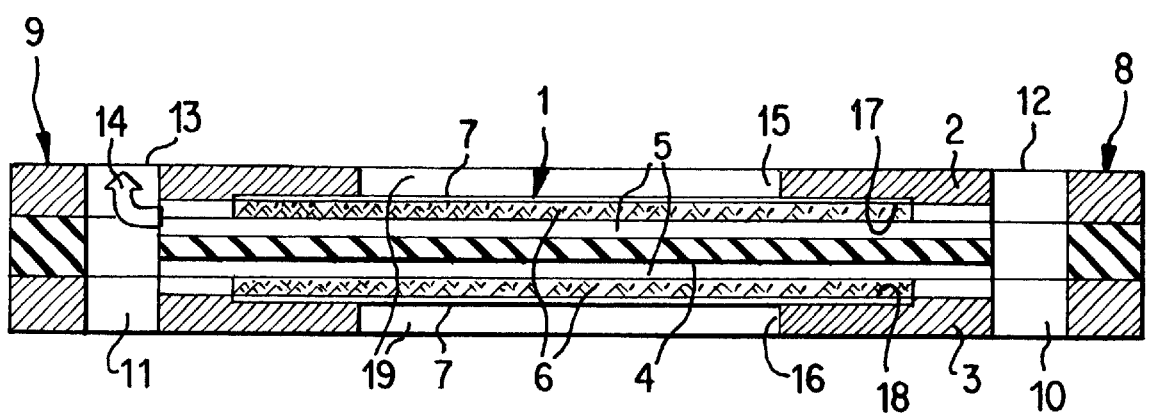
FIG. 2 a longitudinal sectional view taken along line II—II of FIG. 1.

The stacked component unit represented in FIGS. 1 and 2 form a hydrogen-separating membrane module of the stacked plate type comprises a separating unit 1 adjoined on both sides by frame plates 2, 3. The separating unit 1 contains a support plate 4 which is provided on both sides except for a circumferential marginal area with a pattern of parallel grooves 5 and lands. The grooves 5 constitute a structure for receiving a gas mixture, which collects and carries the separated hydrogen. The support plate 4 thus functions as a hydrogen-carrying plate with a hydrogen-removing pattern of grooves 5 to carry the hydrogen away. Also it serves to stiffen the walls. On each of the two sides a hydrogen-permeable metal mesh 6 is placed on the pattern of grooves 5, and a metal membrane 7 permeable to hydrogen is laid on the mesh. The metal mesh 6 serves as a means of support for the metal membrane 7.

As it can be seen in FIG. 2, the support plate 4 and the two adjoining frame plates 2, 3 have, on two opposite side areas 8, 9; connection openings 10, 11 aligned one over the other in the stacking direction, which thus form hydrogen connection passages 12, 13 running perpendicular to the planes of the stacked plates 1, 2, 3 connected to the hydrogen discharging grooves 5 of the support plate. Separated hydrogen 14 can thus be carried through the grooves 5 to a lateral area of the plate be withdrawn from the plate stack through the connection passages.

Figure 3:
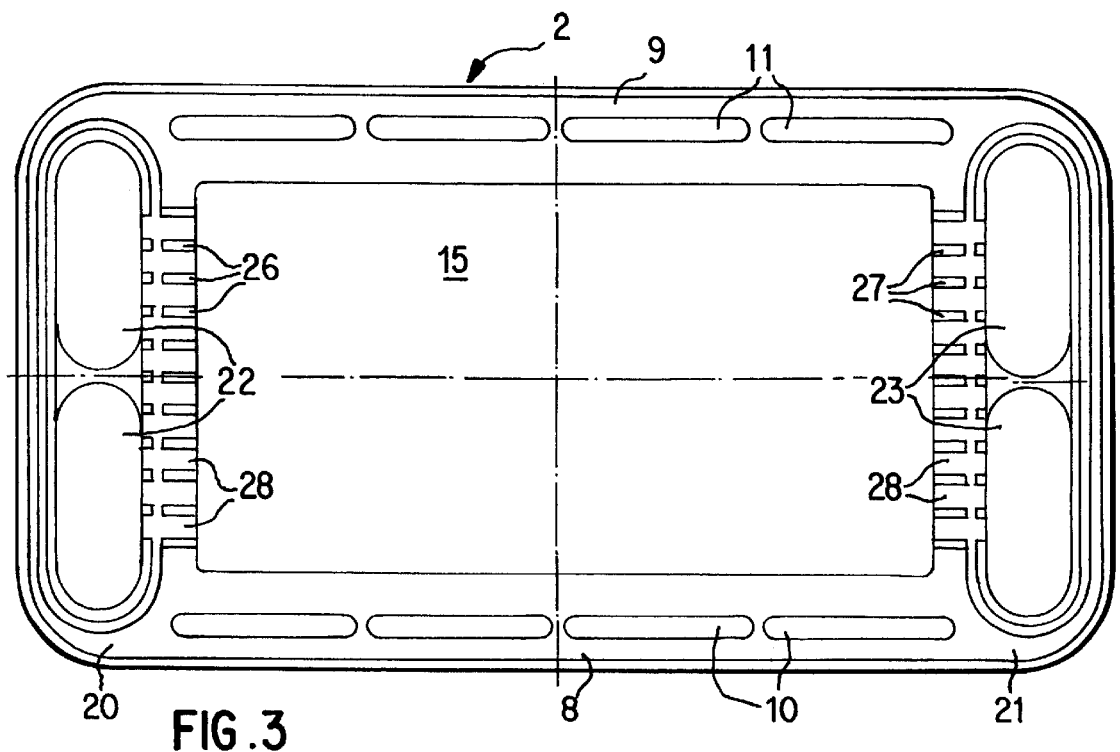
FIG. 3 is a plan view of the side of one of the frame plates facing away from the separating unit.
Figure 4:
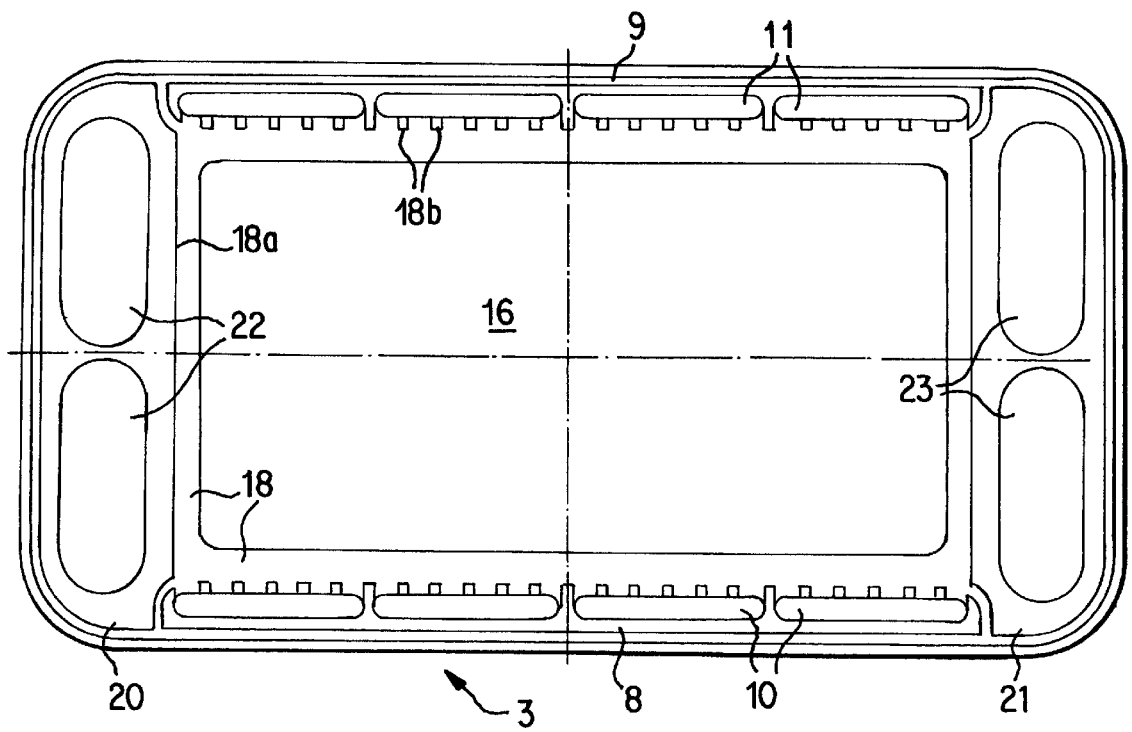
FIG. 4 a plan view of the side of one of the frame plates, facing the separating unit.

As it appears from FIGS. 3 and 4, four slot-like hydrogen connection openings 10, 11 are formed along the two longer sides 8, 9 of the rectangular plates. The hydrogen discharge grooves 5 thus extend along the shorter, transverse ends of the plate stack, so that the separated hydrogen collecting in the grooves 5 can be extracted over a relative short flow path. To promote hydrogen discharge, a flushing gas can be used in a conventional manner. This gas is fed at the stack end through the hydrogen connection channels in the one lateral area, which then function as flushing gas distributing channels, and it exits the plate stack together with the entrained hydrogen through the hydrogen connection passages in the opposite end area.

The frame plates 2, 3 each define broad chambers 15, 16. These chambers 15, 16 define the hydrogen-separating area over which the gas mixture is in contact with the hydrogen separating membranes 7. The membranes 7 and their corresponding metal mesh supporting structures 6 extend slightly beyond these chambers 15, 16, and fit into mating recesses 17, 18, which are created in the frame plates 2, 3 on their sides facing the separating unit 1. FIG. 4 shows lateral margins 18a, 18b, which are formed (1) along the shorter sides of the plates by a continuous edge 18a, and (2) along the longer sides of the plate by abutment posts 18b, which leave passages between them through which the hydrogen discharging support plate grooves 5 lead into the lateral hydrogen connection passages 10, 11.

To construct a ready-to-operate membrane module, first a stack of one or more stacking units placed one on the other is formed according to FIGS. 1 and 2, after which this stack is closed up on both ends by end plates (not shown). Thus, if a plurality of stacking units are used, two chambers 15, 16 of two adjoining frame plates 2, 3, form chambers 19 carrying gas mixtures. As the gas mixture containing the hydrogen that is to be separated flows through these chambers, the gas mixture is carried across the membranes 7 in order to separate the hydrogen.

To bring the gas mixture in and out, two slot-like gas mixture openings 22, 23 are provided in the two shorter end areas 20, 21 of the individual plates 1, 2, 3. At each of these two end areas 20, 21 the pairs of gas mixture openings 22, 23 of the stacked plates 1, 2, 3 overlap to form a gas mixture channel structure comprising two parallel gas mixture connecting channels 24, 25 rising in the stacking direction on each of these two plate ends 20, 21. The gas mixture chambers 19 formed by the chambers 15, 16 of the frame plates 2, 3 are in fluid communication through openings 28 between posts of a comb-like structure 26, 27 with the gas mixture connection openings 22, 23 and thus with the gas mixture connecting channels 24, 25. For this purpose a comb-like structure 26, 27 is formed on the side of each frame plate 2 facing away from the separating unit 1, between the gas mixture connection openings 22, 23 and the corresponding chamber 15, 16.

When in operation, the gas mixture 28 is then introduced in parallel into the gas mixture chambers 19 through the two parallel gas mixture connection channels of the one stack end area, which then function as gas mixture distributing channels. The gas mixture flows through the gas mixture chambers along the longer side of the rectangle and can then be carried away free of hydrogen through the two parallel gas mixture connection channels of the opposite end area which function as manifold channels.

The gas mixture thus flows countercurrently to the separated hydrogen along the longer side of the stack, while the hydrogen is discharged through the shorter side of the stack. This has the advantage that, for a given length of flow of the gas mixture that is necessary for sufficient hydrogen separation, a compact design of the plate stack membrane module. Furthermore, the pressure losses in this membrane module are very low, since the gas mixture enters and leaves through connecting channels of comparatively large cross section and straight through the transverse planes of the stack between the inlet and outlet channel, without being carried around on a serpentine route. A further advantage of the module constructed in this manner consists in the fact that the entry and exit of the gas mixture, just like the discharge of the hydrogen and the feeding of flushing gas, if any, can all take place through one or both stack ends, so that accessibility to the plate stack at its transverse sides is unnecessary. Also, the membrane module is very stable under pressure, and especially the hydrogen separation membranes 7 are sufficiently supported against the pressure acting from adjoining gas mixture chambers 19 by the hydrogen-permeable metal mesh 6 without thereby interfering with the hydrogen removal function of the support plates 4.

A great manufacturing advantage is achievable if the frame plates 2, 3 and the support plate 4, like the hydrogen separation membranes 7 and their metal mesh supporting structure, are made from solderable or weldable materials. Stainless steel is especially considered for the frame plates 2, 3 and the support plate 1. For the separation membranes 7, a specifically hydrogen-permeable metal material, such as metals of element groups IVb, Vb and VIII and their alloys is considered. For the supporting structure a sufficiently gas-permeable mesh, of metal for example, is considered. In this case all these components of the membrane module can be assembled to form the plate stack in a gas-tight manner by an appropriate program of soldering or welding by a soldering or welding process. All welding processes are suitable, for example, laser beam, ultrasonic, rolled seam welding, and the like. The individual plates can be laid successively on the stack in formation and bonded to it hermetically, or first the desired number of individual stack components, each prepared from one separating unit 1 and the two frame plates 2, 3 attached to them, and then the individual stack units can be combined to form the entire membrane module plate stack. A membrane module made thus of metal withstands high pressures under a hydrogen atmosphere at temperatures up to 350° C., as required, for example, in the separation of hydrogen from reformate gas from a steam reforming of methanol. The assembly of the module by soldering or welding can be performed in large numbers and with a high processing and manufacturing accuracy, at low cost. Depending on the application, the stack components or large partial stack units can be tested for gas tightness before they are completely assembled. The modular design permits easy adaptation to various classes of performance, by using different numbers of stack components and/or plates with different basic dimensions.

In general, the above-described example makes it clear that the membrane module according to the invention can be constructed in a compact and modular manner with very high feed rates by assembling them by a reliable method, such as, for example, laser beam welding. The nature of the channels leads to only low pressure losses and to a uniform distribution of the flow. With the membrane module according to the invention, hydrogen with a purity of better than 99.99999% can be separated from the reformate gas of a methanol reforming reaction and delivered with this high purity to a fuel cell system, for example. It is to be understood that the membrane module can also be used for other purposes where a selectively separable gas is to be removed from a gas mixture by means of a separating membrane.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A membrane module for selective gas separation, comprising:
   (A) one or more separation units, each separating unit comprising a support plate, a gas-receiving structure, and at least one gas-separation membrane;
   (B) frame plates connected to said one or more separation units and defining one or more gas-mixture flow chambers;
   (C) first gas-mixture connection openings disposed in a first side area, which overlap one another in a stacking direction, forming a first gas-mixture connecting channel structure;
   (D) second gas-mixture connection openings disposed in a second side area, which overlap one another in the stacking direction, forming a second gas-mixture connecting channel structure;
   (E) first separation-gas connection openings disposed in a third side area, which overlap one another in the stacking direction, forming a first separation-gas connecting channel structure; and
   (F) second separation-gas connection openings disposed in a fourth side area, which overlap one another in the stacking direction, forming a second separation-gas connection channel structure,
   wherein the first and second gas-mixture connection channel structures are configured to allow a gas mixture to be fed in parallel from the first gas-mixture connection channel structure to the second gas-mixture connection channel structure over an entire surface of the at least one gas-separation membrane facing the one or more gas-mixture flow chambers,
   wherein the first and second separation-gas connecting channel structures are in fluid connection with the gas-receiving structure,
   wherein each separation unit and the frame plates are rectangular and the first and second gas-mixture connection channel structures are situated at the two short rectangle sides and the first and second separation-gas connecting channel structures are situated at the two long rectangle sides.

2. A membrane module according to claim 1, wherein the gas-receiving structure comprises a pattern of grooves on the support plate.

3. A membrane module according to claim 1, wherein the support plate comprises a porous support structure interposed between the support plate and the gas-receiving structure.

4. A membrane module according to claim 1, wherein the frame plates comprises recesses for securing the at least one gas-separation membrane.

5. A membrane module according to claim 3, wherein:
   the gas-separation membrane comprises a metal material permeable to a gas to be separated,
   the support structure comprises a metal mesh,
   the support plate and the frame plates are made of stainless steel.

6. A membrane module according to claim 1, wherein said module is a gas-tight plate stack.

7. A membrane module according to claim 6, wherein components of said module are assembled together by soldering or welding.

8. A method of separating a gas from a gaseous mixture, comprising:
   flowing a gaseous mixture through one or membrane separation units of a membrane module, thereby separating the gas; and
   obtaining the gas from the first and second gas-separation connection channel structures,
   wherein said membrane module comprises:
   one or more separation units, each separating unit comprising a support plate; a gas-receiving structure; and at least one gas-separation membrane;
   frame plates connected to said one or more separation units and defining one or more gas-mixture flow chambers;

first gas-mixture connection openings disposed in a first side area, which overlap one another in a stacking direction, forming a first gas-mixture connecting channel structure;

second gas-mixture connection openings disposed in a second side area, which overlap one another in the stacking direction, forming a second gas-mixture connecting channel structure;

first separation-gas connection openings disposed in a third side area, which overlap one another in the stacking direction, forming a first separation-gas connecting channel structure; and second separation-gas connection openings disposed in a fourth side area, which overlap one another in the stacking direction, forming a second separation-gas connection channel structure, wherein the first and second gas-mixture connection channel structures are configured to allow the gaseous mixture to be fed in parallel from the first gas-mixture connection channel structure to the second gas-mixture connection channel structure over an entire surface of the at least one gas-separation membrane facing the one or more gas-mixture flow chambers, wherein the first and second separation-gas connecting channel structures are in fluid connection with the gas-receiving structure, wherein each separation unit and the frame plates are rectangular and the first and second gas-mixture connection channel structures are situated at the two short rectangle sides of the membrane module and the first and second separation-gas connecting channel structures are situated at the two long rectangle sides of the membrane module.

9. A method according to claim 8, wherein the gas is hydrogen.

10. A membrane module according to claim 1, comprising an alternately stacked separation unit and frame plates.

11. A membrane module according to claim 10, wherein the stacked frame plates are laterally inverted.

12. A membrane module for selective gas separation, comprising:

(A) a rectangular separation unit comprising a support plate having a gas-receiving structure and at least one gas-separation membrane on a surface of the support plate;

(B) rectangular frame plates adjoining said separation unit, each frame plate having a gas-mixture flow chamber having a side facing the at least one gas-separation membrane;

(C) first gas-mixture connection openings disposed in a first short side area of each rectangular frame plate, which overlap one another in a stacking direction, thereby forming a first gas-mixture connecting channel structure;

(D) second gas-mixture connection openings disposed in a second short side area of each rectangular frame plate, which overlap one another in the stacking direction, thereby forming a second gas-mixture connecting channel structure, wherein the first and second gas-mixture connection channel structures are configured to allow a gas mixture to be fed in parallel from the first gas-mixture connection channel structure to the second gas-mixture connection channel structure over an entire surface of the at least one gas-separation membrane facing the one or more gas-mixture flow chambers along a length of the rectangular frame plates;

(E) first separation-gas connection openings disposed in a first long side area of each rectangular frame plate, which overlap one another in the stacking direction, thereby forming a first separation-gas connecting channel structure; and (F) second separation-gas connection openings disposed in a second long side area of each rectangular frame plate, which overlap one another in the stacking direction, thereby forming a second separation-gas connection channel structure, wherein the first and second separation-gas connection channel structures are configured to allow a separation gas to be fed in parallel through the gas receiving structures of the support plates along a width of the rectangular frame plates.

* * * * *